United States Patent [19]
Rasmussen et al.

[11] Patent Number: 5,822,119
[45] Date of Patent: Oct. 13, 1998

[54] RETROREFLECTIVE SHEETING MATERIAL, A METHOD OF ITS PRODUCTION AND ITS USE

[75] Inventors: Michael Rasmussen, Copenhagen; Per Eld Ibsen, Søborg; Jan Stensborg, Copenhagen, all of Denmark

[73] Assignee: Kell Erik Franke, Copenhagen, Denmark

[21] Appl. No.: 360,786

[22] PCT Filed: Oct. 4, 1994

[86] PCT No.: PCT/DK94/00366

§ 371 Date: Sep. 25, 1995

§ 102(e) Date: Sep. 25, 1995

[87] PCT Pub. No.: WO95/10827

PCT Pub. Date: Apr. 20, 1995

[30] Foreign Application Priority Data

Oct. 4, 1993 [DK] Denmark ................................. 1112/93

[51] Int. Cl.⁶ .................................................. G02B 5/124
[52] U.S. Cl. ........................... 359/515; 359/530; 359/532; 359/534; 359/546; 359/552; 116/63 R; 404/12; 404/16
[58] Field of Search ........................... 359/515, 529–533, 359/534–539, 546, 565–567, 572, 599, 15, 900; 156/272.2, 273.7, 238, 249, 324; 264/1.9, 165, 239, 299, 319; 116/63 R, 63 P, 63 C, 63 T; 404/9, 12–14, 16

[56] References Cited

U.S. PATENT DOCUMENTS

| | | |
|---|---|---|
| 2,354,018 | 7/1944 | Heltzer et al. . |
| 2,354,049 | 7/1944 | Palmquist ................................. 40/135 |
| 2,407,680 | 9/1946 | Palmquist et al. . |
| 3,758,192 | 9/1973 | Bingham . |
| 3,993,401 | 11/1976 | Strehlow . |
| 4,036,552 | 7/1977 | Lee et al. ................................. 359/515 |
| 4,244,683 | 1/1981 | Rowland ................................. 425/143 |
| 4,332,847 | 6/1982 | Rowland ................................. 428/156 |
| 4,526,439 | 7/1985 | Okoshi et al. ......................... 359/530 |
| 4,758,296 | 7/1988 | McGrew ................................. 156/231 |
| 5,171,624 | 12/1992 | Walter ................................... 428/156 |

FOREIGN PATENT DOCUMENTS

| | | |
|---|---|---|
| 3012500 | 8/1981 | Germany . |
| 2245194 | 1/1992 | United Kingdom . |

*Primary Examiner*—James Phan
*Attorney, Agent, or Firm*—Jacobson, Price, Holman & Stern, PLLC

[57] ABSTRACT

A retroreflective sheeting material comprising at least one retroreflective optical system (200, 300, 400) consisting of an entrance transmission optical element (201, 301) for receiving and focusing incident electromagnetic radiation from an irradiation source, and a reflective optical element (205, 405) for reflecting the incident electromagnetic radiation back toward the irradiation source; said reflective optical element being positioned in or near the effective focal point of the transmission optical element and the space between the optical elements optionally being constituted by a spacing material (202); wherein at least one of the optical elements (205, 301, 405) is a diffractive optical element, the reflective optical element (205, 405) for substantially all angles of incidence sends at least a part of the incident electromagnetic radiation back along the direction of the incoming chief ray (204), and the reflective optical element does not exclusively consist of a specular mirror type reflective optical element; methods of making such a retroreflective sheeting material; and use of the retroreflective sheeting material for the manufacture of a sign, a marker, or a decoration all of which exhibit retroreflective reflexes upon illumination.

30 Claims, 10 Drawing Sheets

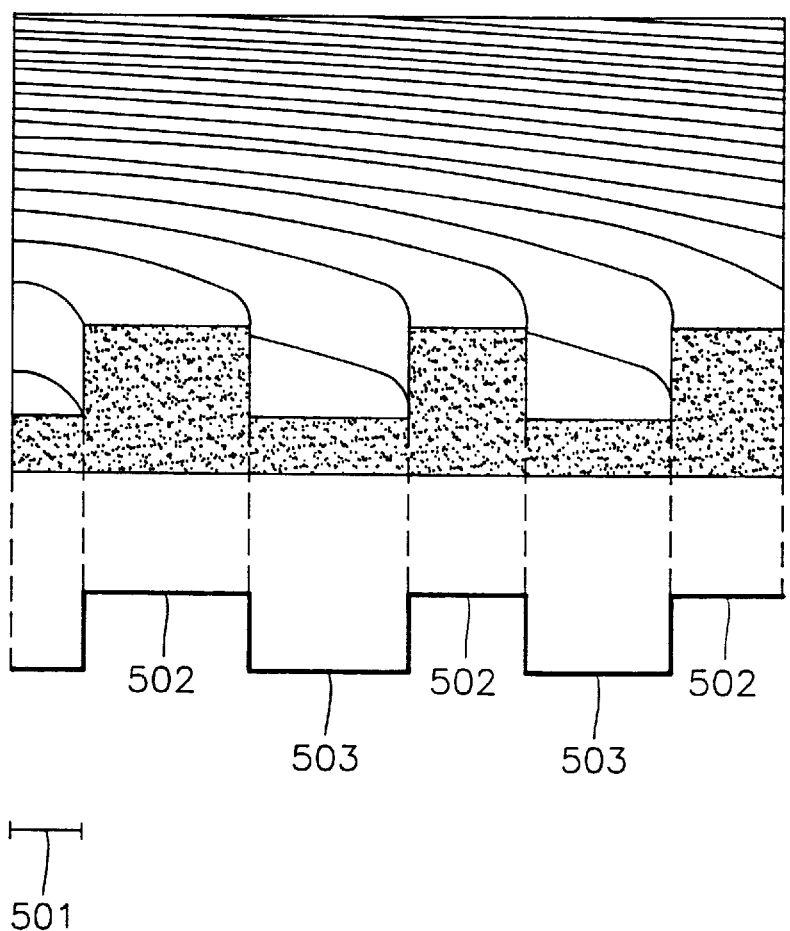

RETROREFLECTIVE SHEETING MATERIAL, A METHOD OF ITS PRODUCTION AND ITS USE

BACKGROUND OF THE INVENTION

The present invention relates to a retroreflective sheeting material; methods of making this retroreflective sheeting material, and its use for the manufacture of signs, markers, and decorations.

1. The Technical Field

For the visible light region of the electromagnetic spectrum, retroreflective sheeting materials are used in a broad range of applications including but not limited to signs and markers of the reflex type. These reflex type materials provide a greater visibility at night compared to ordinary reflective materials such as mirror type or diffusing type reflectors because the retroreflected light is automatically returned toward the light source in a concentrated, more narrow cone in the field of viewing than ordinary reflected light.

Retroreflective sheeting materials are not limited to applications in the visible region of the electromagnetic spectrum. They may also be applied e.g. in the infrared region of the spectrum to retroreflect guidance light for aeroplanes. Therefore, retroreflective sheeting materials may not only comprise retroreflective optical systems reflecting light retroreflectivily but may generally comprise retroreflective electromagnetic systems reflecting electromagnetic radiation retroreflectively.

"Micro Glass Sphere-type Retroreflective Sheeting Material"

A known retroreflective sheeting material of the "open surface" type is based on micro glass spheres the exposed transparent surface of which is not covered with a protective layer. This material is prepared by cascading transparent micro glass spheres with a high refractive index and ranging in diameter from 70 to $100\mu$ onto a carrier sheet which is covered with a heat-softenable layer of low-density polyethylene; thermally sinking the micro glass spheres to about 50% of their diameters by passing the carrier through a tunnel oven; and coating the exposed surfaces of the micro glass spheres with a vapor coated aluminium layer. The exposed parts of the micro glass spheres are then bonded into a polymeric bead bond layer on a sheeting material such as textile or adhesive paper, and the carrier liner is stripped away.

Functionally, these retroreflective optical systems consist of an entrance transmission optical element for receiving and focusing incident electromagnetic radiation from an irradiation source which is specifically constituted by the optionally transparent solid covering in combination with the transparent spheres refracting the incident light, and they further consist of a reflective optical element for reflecting the incident electromagnetic radiation back toward the irradiation source which is constituted by the transparent spacer film in combination with the back reflector; said reflective optical element being positioned in or near the focal point of the entrance transmission optical element, i.e. the focal point defined by spheres and spacing film in combination is located in or near the back surface of the spheres embedded in a reflective binder, or in or near the back reflector.

Generally, a spherical type retroreflective sheeting material has a good retroreflectivity for small as well as for large angles of incidence. However, maximum retroreflectivity is obtained for an angle of incidence close to zero, i.e. when the light is incident normal to the plane of the sheeting material. For increasing angles of incidence the retroreflectivity slowly decreases.

A disadvantage of the spherical type retroreflective optical system is that the angle of reflected rays is scattered significantly due to spherical aberration. Thus, a spot diagram obtained by raytracing a spherical type retroreflector having a refractive index of 1.9 showed that the angle of reflected rays scattered±10 degrees for an angle of incidence of zero degrees.

Ideally, a perfect retroreflection without spherical aberration can only be obtained for paraxial rays incident on a transparent sphere having an index of refraction equal to two. However, transparent materials of e.g. glass or plastic having an index of refraction of 2.0 are not readily available.

Another disadvantage of retroreflective sheeting materials based on the spherical type retroreflective optical system is that the retroreflectivity does not vary substantially with the wavelength except for the chromatic aberration whereby a retroreflection of a given wavelength cannot directly be obtained by illumination with white light or with diffuse daylight. Instead, either a transparent color film or coating has to be applied on the top of the transparent covering on the spheres or on the flat front face, or the individual spheres have to be coated with a transparent color film or coating.

Also, it is a disadvantage that such retroreflective sheeting materials comprising several retroreflective optical systems designed for different wavelengths cannot easily be produced.

A further disadvantages of retroreflective sheeting materials based on the spherical type retroreflective optical system is that the spheres cannot be packed infinitely close whereby the efficiency of retroreflectivity of the sheeting material becomes limited by the packing density of the spheres.

Further disadvantages comprises requirements of high purity of the transparent material of e.g. glass or plastic for the spheres, and requirements of the accuracy of the spherical shape of the spheres and their fixation in the sheeting material all of which requirements increase the costs of the final product.

Also, the method of making the final retroreflective sheeting material is complicated and it involves laborious know how and unique equipment for each step which makes the final product even more expensive.

"Micro Prisms Embossed Retroreflective Sheeting Material"

Another type of retroreflective sheeting material is based on micro prisms embossed closely spaced and parallel to the front face of a plastic foil of e.g. polyester or polyvinylchloride. This material comprises a retroreflective optical system consisting of a 60 degrees three-sided pyramid which provides a perfect reflection for a small angle of incidence, but the reflection efficiency of which declines rapidly at greater angles.

Also, there is no symmetry of rotation of the reflection whereby the material exhibits an uneven retroreflected energy pattern.

A further disadvantage is that a high efficiency of reflection can only be obtained when the embossed prisms have perfectly shaped angles which is difficult to achieve unless the embossing is performed in a stepwise manner which allows the plastic foil to cool from a temperature of about 200° C. at the beginning of embossing until the mould can be released without injuring the embossments.

"Fresnel Zone Plates Embossed Retroreflective Sheeting Material with Specular Reflecting Back Surface"

Still another type of retroreflective sheeting material is based on Fresnel zone plates embossed in the surface of a transparent medium, the back surface of which has a specular reflecting coating.

This retroreflective material comprises a diffractive entrance optical element in form of a Fresnel zone plate and a specular reflecting mirror on the back surface of the transparent medium.

A disadvantage is that even for relative small angles of incidence, the specular reflecting mirror will give rise to a large loss of electromagnetic radiation, because the specular reflection guides a large fraction of the reflected electromagnetic radiation in directions different from that of the retroreflective direction.

The incoming light will be focused by the Fresnel zone plate on the specular reflective back surface, but the law of reflection for this specular reflecting back surface will even for small angles cause the reflection of the incoming focused light to miss the Fresnel zone plate through which it entered and probably be sent in a direction towards a neighbour Fresnel zone plate positioned nearby. Generally, only electromagnetic radiation exiting through the same Fresnel zone plate as it entered will be diffracted by this Fresnel zone plate back towards the irradiation source, i.e. the retroreflective direction. Therefore, this retroreflective material has a significantly lower efficiency for angles of incidence which are not very close to the optical axis.

2. Prior Art Disclosure

U.S. Pat. Nos. 2,354,018 and 2,354,049 disclose the basic prior art reflex reflectors based on transparent spheres and a flat back reflector.

U.S. Pat. No. 2,407,680 discloses an optical sheet adapted to be associated with and produce reflex light reflection from a reflecting surface, including a light-returning layer formed of a large number of contigous small transparent spheres whose back extremities are optically exposed for rearward passage of lights rays, and a continous overlying transparent solid covering united and conforming to the front extremities of said spheres and having a flat front face; said spheres having a refractive index at least 1.15 times that of said transparent covering.

U.S. Pat. No. 3,758,192 discloses a reflex-reflecting structure comprising a plurality of layers in which the outermost layer comprises a monolayer of glass beds, preferable having diameters within the range of 25 to 250 microns and a refractive index of at least 1.8. The beads are approximately hemispherically embedded in a binder material such as a substantially clear and colorless resin. In order to provide an efficient reflex-reflective material which tends to approach the efficiencies obtained by using aluminium as reflective material and at the same time avoid undesirable "off-colors", the binder contains specularly reflective nacreous pigment particles which have a maximum dimension size falling within the range of 8 to 30 microns but less than the diameter of the glass beads and a thickness within the range of 25 to 200 nanometers, the binder preferably containing at least about 15% by weight of pigment based on the total vehicle solids.

U.S. Pat. Nos. 4,244,683; 4,332,847; 5,171,624; and GB Patent Application No. 2 245 194A disclose retroreflective microprismatic materials, and methods and apparatus of making the same, e.g. by compression moulding. Nothing is indicated or suggested about the retroreflective optical systems of these materials being based on diffractive optical elements.

U.S. Pat. Nos. 4,036,552 and 3,993,401 disclose a retroreflective material including a transparent medium containing a plurality of diffraction elements comprising light interference fringe patterns and a method of making such a retroreflective material comprising providing a stamper for embossing an array of phase modulated Fresnel zone plates having a given focal length; embossing phase modulated Fresnel zone plates at one surface of a transparent copy medium having a thickness equal to said focal length; and coating a specular reflective surface on the opposite surface of said copy medium.

DISCLOSURE OF THE INVENTION

Objects of the Invention

It is the object of the present invention to provide a retroreflective sheeting material comprising a retroreflective electromagnetic system which selectively returns the incident radiation in an angle which is substantially the angle of incidence but which returned radiation propagates in the opposite direction; particularly a retroreflective optical system which has a reduced spherical aberration for a given wavelength with respect to a micro glass spherical-type retroreflective sheeting material, and improved retroreflection for angles far from the optical axis with respect to Fresnel zone plate embossed retroreflective sheeting materials with specular reflecting back surfaces.

It is another object of the present invention to provide such a retroreflective sheeting material for which the reflectivity is optimized for a desired angle of incidence and not necessarily for an angle normal to the sheeting material as for conventional retroreflective sheeting materials.

It is still another object of the present invention to provide such a retroreflective sheeting material which comprises several retroreflective optical systems designed for different wavelengths.

It is a further object of the invention to provide such a retroreflective sheeting material for which the retroreflective optical system can be positioned in a controlled manner and with a higher packing density than for spherical type retroreflective sheeting materials.

It is a still further object of the invention to provide such a retroreflective sheeting material which is cheaper and easier to produce than conventional retroreflective sheeting materials.

It is also the object of the present invention to provide methods of making such retroreflective sheeting materials and use thereof.

Further objects appear from the description.

A. Retroreflective Sheeting Material
Solution and Advantageous Effects of the Invention According to the invention, these objects are fulfilled by providing a retroreflective sheeting material comprising at least one retroreflective optical system consisting of:

a) an entrance transmission optical element for receiving and focusing incident electromagnetic radiation from an irradiation source, and b) a reflective optical element for reflecting the incident electromagnetic radiation back towards the irradiation source;

the reflective optical element being positioned in or near the effective focal point of the transmission optical element; and the space between the optical elements optionally being constituted by a spacing material;

characterized in c) that at least one of the optical elements is a diffractive optical element, d) that the reflective optical element for substantially all angles of incidence sends at least a part of the incident electromagnetic radiation back along the direction of the incoming chief ray, and
e) that the reflective optical element does not consist exclusively of a specular mirror type reflective optical element.

It is intended that the term "retroreflective optical system" should be interpreted broadly to cover retroreflective electromagnetic systems not only in the visible range of the electromagnetic spectrum but also in the far ultraviolet and far infrared regions.

It has surprisingly turned out that spherical aberration of the retroreflective optical system of spherical type retroreflective sheeting materials can advantageously be improved by wholly or partially applying diffractively based optical elements instead of refractively based optical elements.

According to the invention, if at least one of the optical elements i.e. the entrance transmission optical element, the reflective optical element, or both, is a diffractive optical element, it is obtained that spherical aberration of the retroreflective system can be completely reduced for small angles of incidence and significantly reduced for larger angles.

Since the diffraction efficiency of a diffractive optical element can be optimised for a given angle of incidence, it is possible to optimize the retroreflective system comprising at least one diffractive optical focusing element to a given angle of incidence.

Retroreflection is ensured for substantially all angles of incidence by the fact that the reflective optical element sends the incident electromagnetic radiation back through the entrance transmission optical element by non-specular reflection.

Several retroreflective optical systems designed for different wavelengths can be incorporated in the same sheeting material whereby e.g. reflex signs in different colors can be provided in the same retroreflecting sheeting material; said reflex signs either being reflected in different colors at a given angle of incidence, or being reflected in different colors at different angles of incidence. This cannot be obtained by prior art retroreflective optical systems.

Further, the retroreflective optical systems can be produced with a hexagonal, squared, or triangular shape which provides for a close packing density.

Particularly for a pure diffractive retroreflective optical system, refractive optical elements can be avoided whereby the requirements of e.g. micro beads of high refractive index and well-defined shape is avoided which makes the retroreflective materials according to this embodiment of the invention cheaper than conventional retroreflective sheeting materials.

Preferred Embodiments
"Entrance Transmission Optical Element"

According to the invention, the entrance transmission optical element can be any suitable transmission optical element which is able to receive the incident electromagnetic radiation and to focus the received radiation onto the reflective optical element.

In specific embodiments according to the invention, the entrance transmission optical element can be a refractive spherical or aspherical optical element, or a diffractive focusing optical element such as a Fresnel diffractive structure like a Fresnel zone plate, a Fresnel phase plate, or a blazed Fresnel phase plate.

In a preferred embodiment according to the invention, the entrance transmission optical element is a focusing transmission diffractive optical element.

"Reflective Optical Elements"

According to the invention, the reflective optical element can be any suitable reflective optical element which is able to reflect the incident electromagnetic radiation back towards the irradiation source, so that for substantially all angles of incidence the reflective optical element sends the incident electromagnetic radiation back through the entrance transmission optical element by non-specular reflection.

Such reflective optical elements comprise diffractive optical elements which consists of a substrate having a diffractive pattern either embedded therein or disposed thereon and a reflective layer or coating attached either directly or spaced thereto by a spacing material.

When a spacing material is applied between the diffractive optical element and the reflective layer, the thickness of the spacing material is preferably chosen such that the distance from the diffractive optical element to the reflective layer plus the distance from the reflective layer to the entrance transmission optical element equals the effective focal length of the diffractive optical element.

In a preferred embodiment according to the invention the reflective optical element consists of a diffractive optical element having a reflective optical coating coated on its back boundary.

In another preferred embodiment according to the invention, the reflective optical element is a transmission diffractive optical element having said reflective optical coating coated on its back boundary.

In another embodiment according to the invention, the reflective optical element is a diffractive optical element consisting of a transmission diffractive element exhibiting a significant reflection; said element being composed of a material having a refractive index differing from that of the front and back boundaries of the element.

In still another embodiment according to the invention, the reflective optical element is a refractive spherical or aspherical mirror, or a diffractive mirror such as a Fresnel diffractive structure like a Fresnel zone plate, a Fresnel phase plate, or a blazed Fresnel phase plate.

In a preferred embodiment, the reflective optical element is a diffuse reflective optical element.

A uniform diffuse reflective optical element has the advantage in the production setup that no alignment of the entrance transmission optical element with respect to the diffuse reflective optical element is necessary. If only the thickness of the spacing material is near the effective focal length of the focusing entrance transmission optical element retroreflection will be ensured.

"Diffractive Optical Elements"

According to the invention, the diffractive optical element can be any suitable diffractive optical element known in the art such as, but not limited to, amplitude or phase holograms, or surface relief holograms.

Further, the diffractive optical elements can have suitable diffraction patterns generated by any known method in the art such as, but not limited to, i) methods of producing amplitude holograms interferometrically in a photographic film such as a silverhalogenide-film without bleaching;

ii) methods of producing phase holograms interferometically in a photographic film such as a silverhalogenide-film with bleaching, or in a photopolymer; or iii) methods of producing surface relief (phase) holograms lithographically or interferometrically in a suitable recording medium such as positive or negative resists, e.g. electron resists or photoresists;

the latter methods of producing surface relief holograms being generally preferred, because surface relief holograms can be mechanically replicated by e.g. thermo-mechanical embossing of a thermoplastic film from an electroformed (nickel) master (hologram) or casting of a fluid thermoplastic or an UV—or thermosetting plastic, or other suitable precursor therefor, wherein the master forms a part of the moulding form; see e.g. R. A. Bartolini et al., "Replication of Relief-Phase Holograms for Prerecorded Video", J. Electrochem. Soc.: Solid-State Science and Technology, Vol. 120, No. 10, October 1973, 1408–1413, the contents of which is hereby incorporated by reference.

Plates carrying the master holograms can be given a cylindrical shape and be mounted onto embossing rolls which allows for continuous embossing into softened suitable plastics such as, but not limited to, vinyl, polycarbonate, mylar or cellulose esters; see e.g. J. J. Cowan and W. D. Slafer, "Holographic Embossing at Polaroid: The Polaform Process", SPIE Vol. 100, Progress in Holographic Applications, 1985, 49–56.

The master holograms can alternatively be given a flat shape and be mounted in a plate press that allows for a semicontinuous embossing, see e.g. U.S. Pat. No. 4,244,683 disclosing apparatus for compression moulding of retroreflective sheetings having a retroreflective optical system of the micro prism type.

In a preferred embodiment according to the invention, the diffractive optical elements comprise surface relief diffraction patterns.

"Positioning of the Entrance Transmission Optical Element with Respect to the Reflective Optical Element"

According to the invention, the reflective optical element is positioned in or near the effective focal point of the transmission optical element.

Accordingly, the pair of optical elements, i.e. the entrance transmission optical element and the reflective optical element, are designed for a given mutual distance between the elements which in turn depends on the desired thickness of the sheeting material.

The optical elements may be orientated in any suitable direction, i.e. the orientations of the center axes of the two optical elements may be designed to have any suitable directions.

In preferred embodiments according to the invention, the orientation of the center axis of the entrance transmission optical element with respect to the orientation of the center axis of the focusing reflective optical element is selected from the group of axis orientations consisting of non-parallel axes, substantially parallel axes, or substantially coinciding axes.

It is preferred that the axes are substantially parallel and closely spaced, particularly substantially coinciding.

"Spacing Materials"

The spacing material may be any suitable spacing material known in the art.

In a preferred embodiment according to the invention, the space between the optical elements, the space between the transmission diffractive optical element and the reflective coating of the reflective optical element, or both, are constituted by a spacing material selected from the group consisting of dielectric or substantially dielectric materials such as glass, hard plastic, soft plastic, air, or combinations of these.

"Dye Additives"

The retroreflective sheeting material may be colored by addition of any suitable dye known in the art.

In a preferred embodiment according to the invention, at least one of the entrance transmission optical element, the reflective optical element, the diffractive element with reflective optical coating, the reflective optical coating, the diffuse reflective optical element, or the spacing materials contain one or more dyes.

Also, the carrier of the optical elements and/or the spacing material can be pre-dyed in any transparent color or fluorescent transparent color.

When it is desired to produce multi colors or images, the surface of the sheeting material can be printed imagewise by screen-printing or flexoprint. When a protective layer is applied, this material can be pre-printed in any desired pattern.

If the colors are to be reflective by night appearance, the ink has to be transparent. When only colored day time appearance is wanted, an ordinary non-transparent ink can be used.

A preferred ink used by the serigraphic industry and supplied in transparent as well as non-transparent form consists of cyclohaxanon, 1-methoxy-2-propylacetate, 3-methoxy-n-butylacetate, ethyl-3-ethoxypropionate, and $C_9$–$C_{10}$ aromates. It is sold under the trademark Bargoscreen™ 2K-6500.

"Protective Layer"

The retroreflective sheeting material may be covered by a protective layer consisting of any suitable transparent material.

In a preferred embodiment according to the invention, a protective material is coated on the front boundary of the entrance transmission optical element, the back boundary of the reflective optical element, or both.

When a protective layer is applied to surface relief diffractive optical elements, it is preferred that the diffractive pattern is deeper than the diffractive pattern when a protective layer is not applied. The depth of the diffraction pattern can be optimized by the skilled person either imperically or by diffraction efficiency calculation according to "Diffraction Analysis of Dielectric Surface Relief Gratings", M. G. Moharam and T. K. Gaylord, Journal of the American Optical Society, Vol. 72, No. 1, Nov. 1982, 1385–92 the contents of which is hereby incorporated by reference.

"Carrier Material"

The retroreflective optical system may be supported by any suitable carrier known in the art such as textile web or adhesives, optionally self-sticking adhesives.

In many applications the carrier is the sheeting material itself.

B. Methods of Making Retroreflective Sheeting Materials

In another aspect, the present invention also related to methods of making retroreflective sheeting materials.

"Joining Two Sheeting Substrates"

The optical elements may be provided on the respective first and second sheeting substrates by any method known in the art as mentioned above.

Then the first and second sheeting substrates are joined by any suitable joining technique in the art comprising but not limited to adhesion.

It is preferred that the reflective optical element is a diffractive optical element or a diffuse reflective optical element.

"Processing of One Sheeting Substrate"

According to this method the optical elements are provided on the first and the opposite side of a sheeting substrate.

It is preferred that the reflective optical element is a diffractive optical element or a diffuse reflective optical element.

"Embossing of Surface Relief Patterns in Opposite Surfaces of a Sheeting Substrate"

It is preferred that the surface relief pattern of the second embossing matrice is a diffracting pattern or a diffuse reflection pattern.

According to this method the surface relief diffraction pattern is provided in the desired optical element by any suitable method known in the art, see the explanations of "Diffractive Optical Elements" above and "Sheeting Substrate Materials" to follow.

Further, the embossing matrices of the master holograms of the surface relief diffraction patterns are provided by any suitable method known in the art such as electroplating by a suitable metal, e.g. nickel, to produce a hard material which can be used as an embossing matrix, e.g. a cylindrical embossing roll or a flat embossing plate press.

Embossing of the relief diffraction patterns of the entrance transmission optical element and of the reflective optical element in the sheeting material may take place either simultaneously or subsequently.

In a preferred embodiment according to the invention, the embossing step consists of thermo-mechanical embossing the pairs of surface relief diffractive patterns simultaneously in opposite surfaces of the sheeting material.

In a preferred embodiment according to the invention, the embossing step consists of a continuous roll-to-roll process.

The embossing in the sheeting material may be carried out at any suitable temperature dependence on the sheeting materials.

"Positioning Control"

In replicating two surface relief diffractive optical elements on opposite sides of a sheeting substrate it is important to provide an accurate positioning of the surface relief diffraction patterns with respect to each other.

For a pair of surface relief diffractive optical elements having a diameter of 340 $\mu$m and an embossed profile depth of 1 $\mu$m, and a retroreflective sheeting polymer foil having a thickness of 100 $\mu$m, the accuracy must be better than 10 $\mu$m, preferably about 5 $\mu$m.

In order to obtain this positioning accuracy any suitable position controlling method known in the art may be applied.

In a preferred embodiment according to the invention, the position control comprises:

a) embossing position markers in the sheeting substrate;
b) measuring relative displacements in predetermined directions of the position markers; and
c) adjusting the positions of the embossing matrices, the sheeting substrate, or both, when the measured relative displacements of the position markers exceed predetermined limits.

In a preferred embodiment according to the invention, the position markers are in form of triangles.

In still another preferred embodiment according to the invention said embossing matrices form the parts of a moulding form wherein the sheeting substrate in form of a fluid thermoplastic or an UV- or thermosetting plastic, or any suitable precursor therefor, is moulded.

"Sheeting Substrate Materials"

According to the invention, the sheeting substrate material can be any suitable sheeting material known in the art such as UV-curable polymers.

Such materials comprise, but are not limited to, polyethylene, polymethylmethacrylate, polyvinylchloride, polycarbonates, polyesters including acrylated epoxy oligomers, polyurethanes and acrylated urethanes.

Further, suitable sheeting substrate materials are disclosed in e.g. GB Patent Application No. 2,245,194A and U.S. Pat. No. 4,576,850, the contents of which are hereby incorporated by reference.

C. Use of Retroreflective Sheeting Materials

Still another aspect of the invention is the use of retroreflective sheeting material according to the invention for suitable purposes involving retroreflection, particularly retroreflection with a reduced spherical aberration for a given wavelength and retroreflection optimized for a desired angle of incidence.

In a preferred embodiment according to the invention, the retroreflective sheeting material is used for the manufacture of a sign such as a road sign, a marker such as a sticker, or a decoration, said sign, marker or decoration exhibiting retroreflective reflexes upon illumination.

Further signs or markers include but are not limited to signs for highway, traffic, and runway signs; post and barrels markers; and warning signs.

Definition of Expression

Within the present context it is intended that the term "electromagnetic radiation" designates electromagnetic radiation that can be diffracted by a suitable diffractive element, particularly electromagnetic radiation generally having a wavelength in the range from 10 nm to 100 $\mu$m, preferably in the range from 100 to 1000 nm, particularly in the visible range of the electromagnetic spectrum from about 400 to about 700 nm, and which can be diffracted by a suitable diffractive optical element designed to function at desired wavelengths. Hence the concept "diffractive optical element" should be interpreted broadly to include diffractive elements suitable for electromagnetic radiation of other wavelengths than those typically considered to be in the "optical" range.

Within the present context, it is intended that the term "retroreflection" designates reflection of incident electromagnetic radiation in a direction which is substantially opposite to the direction of the incident electromagnetic radiation; said direction being either coinciding or parallel with the direction of incidence. Thus, retroreflection selectively returns the incident radiation in an angle which is substantially the angle of incidence but which reflected radiation is propagating in the opposite direction. This selective reflection of electromagnetic radiation back in the angle of incidence is different from the reflection of mirror type reflectors reflecting the incident light specularly so that the angle of incidence equals the angle of reflection. Also, this selective reflection is different from the reflection of the diffusing type reflectors reflecting the incident radiation in all directions.

Within the present context it is intended that the term "spherical aberration" designates the focusing defect of not bringing all parallel rays to a focus at a unique point.

Within the present context it is intended that the angle of incidence designates an angle of zero degrees when the incident electromagnetic radiation propagates normally to the surface of the sheeting substrate.

Within the present context it is intended that the term "sheeting material" designates a continuous thin sheet or film material which is suitable for carrying the optical elements of the retroreflective optical system according to the invention.

Within the present context it is intended that the term "chief ray" designates the geometrical ray of electromagnetic radiation originating from an illumination source and passing through the center of the limiting aperture, which in all preferred embodiments is the aperture of the entrance transmission optical element.

BRIEF DESCRIPTION OF THE DRAWINGS

FIG. 5 shows a scanning electron microscopic image of a section of a transmission entrance focusing diffractive optical element obtained by lithographic production;

DETAILED DESCRIPTION

A. Retroreflective Sheeting Material

"Prior Art Retroreflective Sheeting Materials"

Figure 1A:
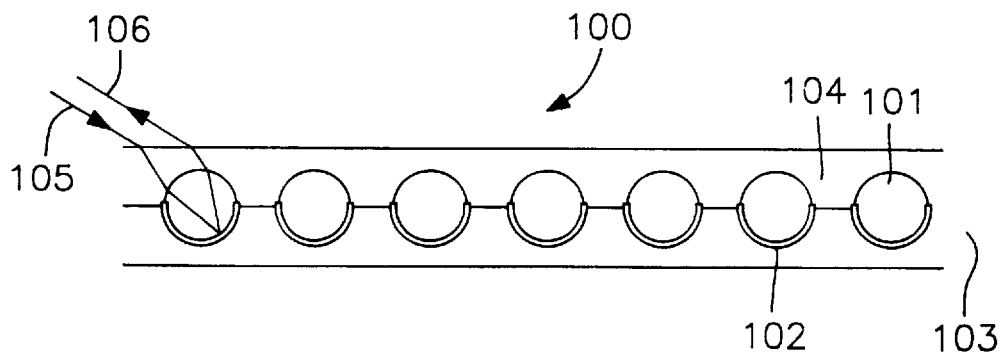
FIG. 1A shows a cross-sectional sketch of a retroreflective sheeting material of the spherical type according to the prior art.

Referring to FIG. 1A there is shown a cross-sectional sketch of a retroreflective sheeting material 100 of the spherical type according to the prior art.

Glass/plastic spheres 101 are partly covered with a reflective layer 102 and partly imbedded in a sheeting material 103. The part of the spheres not covered with a reflective layer is optionally covered with a protective layer 104. Incident light 105 entering the protective layer 104 is transmitted through the spheres 101 and reflected by the reflective layer 102. The reflected light 106 is then (ideally) reflected in the opposite direction of the incident light 105.

For clarity reasons, an opaque or absorbing barrier coating between the spheres is not shown.

Figure 1B:
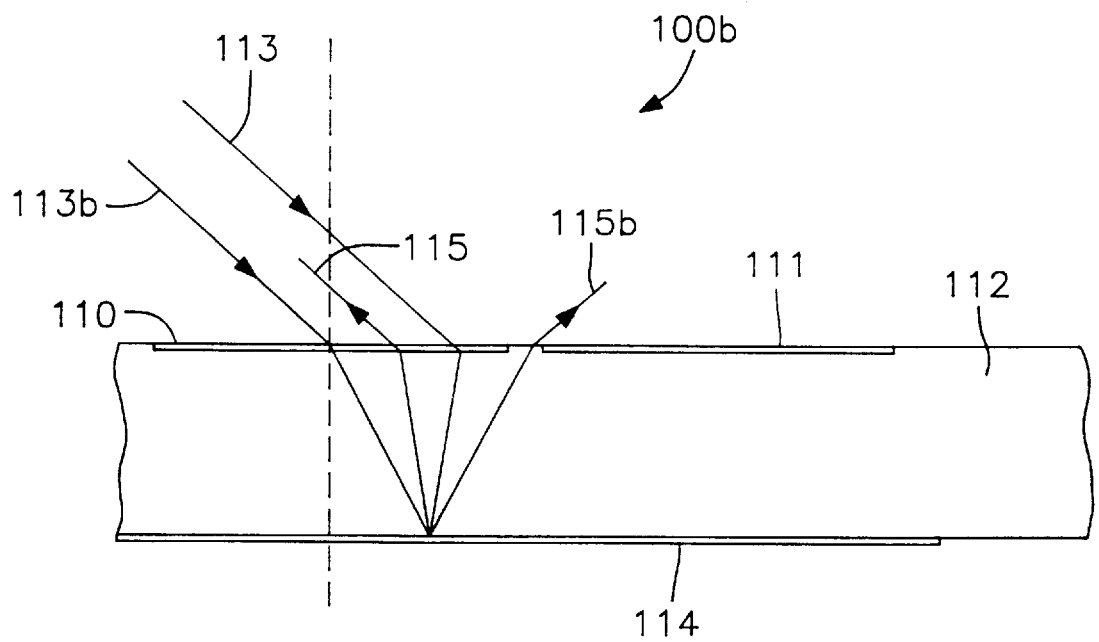
FIG. 1B shows a cross-sectional sketch of the Fresnel zone plate type with specular reflective mirror according to the prior art.

Referring to FIG. 1B there is shown a cross-sectional sketch of a retroreflective sheeting material 100b of the Fresnel zone plate type with a specular reflecting coating.

Fresnel zone plates 110, 111 are embossed in the front surface of a transparent sheeting substrate 112 facing the incident light 113, 113b, and a specular reflective mirror 114 is coated on the rear surface of the substrate; said substrate having a thickness corresponding to the focal length of the Fresnel zone plates 110, 111.

For the shown angle of incidence, none of the incident light 113, 113b will be reflected retroreflectively directly back along the incident chief ray 113b by the specular reflecting mirror 114. Some of the light 113 will be reflected back in ray 115.

It is also shown that some of the reflected light 115b will miss the specific Fresnel zone plate 110 through which it entered and therefore be sent back in a direction different from the retroreflective direction.

"Preferred Embodiment of Retroreflective Sheeting Materials According to the Invention"

Figure 2:
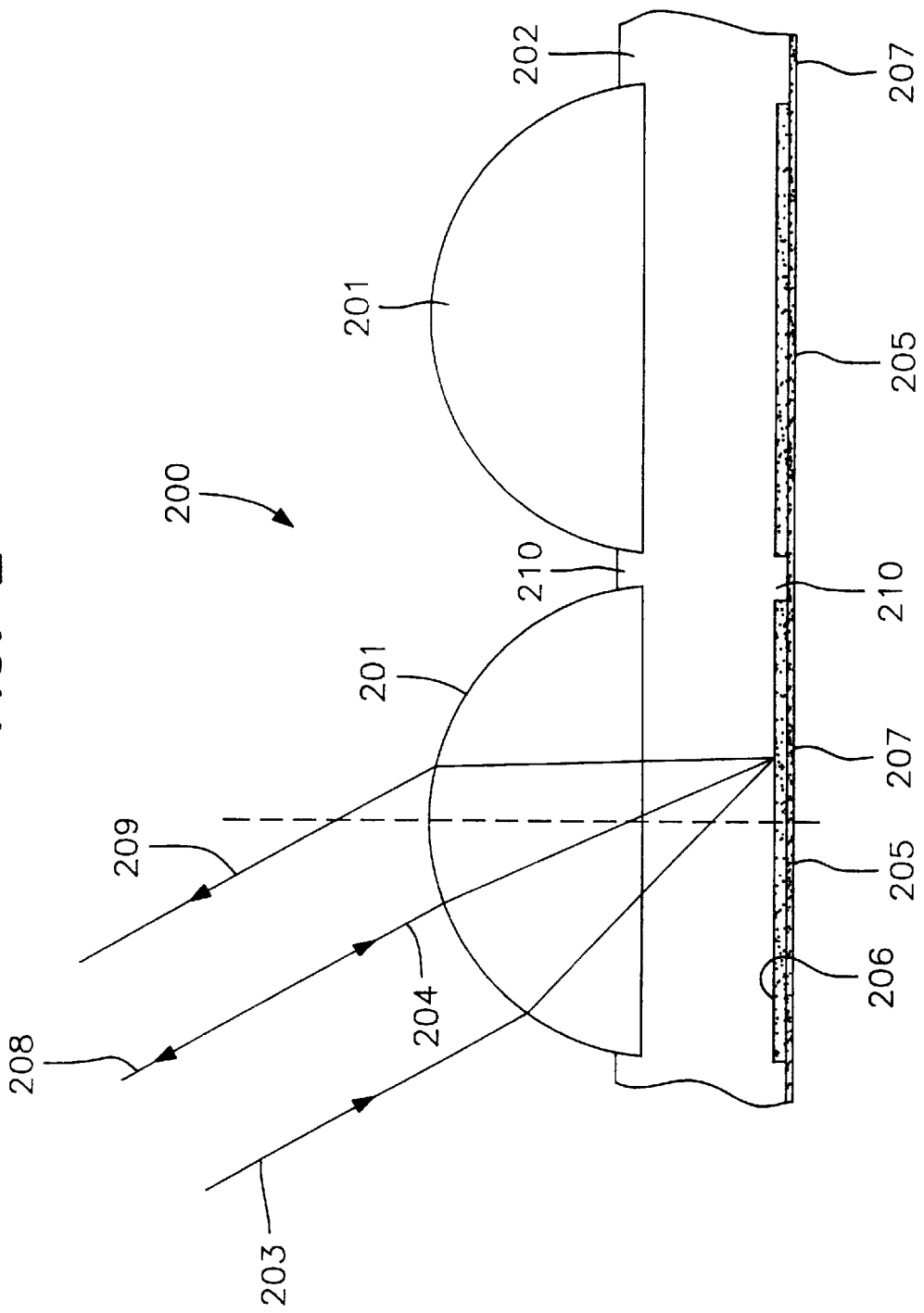
FIG. 2 shows a cross-sectional sketch of a preferred embodiment of a retroreflective sheeting material of the spherical type with a reflecting diffractive optical element according to the invention.

Referring to FIG. 2 there is shown a cross-sectional sketch of a section of a preferred embodiment of a retroreflective sheeting material 200 according to the invention comprising an entrance transmission optical element consisting of half-spherical lenses 201 embedded in a sheeting substrate 202 which at its back side opposite the side of incident light 203, 204 and vis-à-vis the half-spherical lenses has reflective optical elements consisting of a reflective diffractive optical element 205 (or reflective holographic optical element), including a diffractive surface relief pattern 206 and a reflective coating 207; said reflective coating 207 may fully or partly cover the back surface of the sheeting substrate; said reflective coating 207 may fully or partly cover the back surface of the sheeting substrate. The reflected light 208, 209 is reflected back towards the irradiation source by having the reflective diffractive optical element 205 sending at least a part 208 of the incident electromagnetic radiation back along the direction of the incoming chief ray 204. The space 210 between the half-spheres or reflective diffractive optical elements can have a suitable barrier or diffuse reflecting coating (not shown), if desired.

Figure 3:
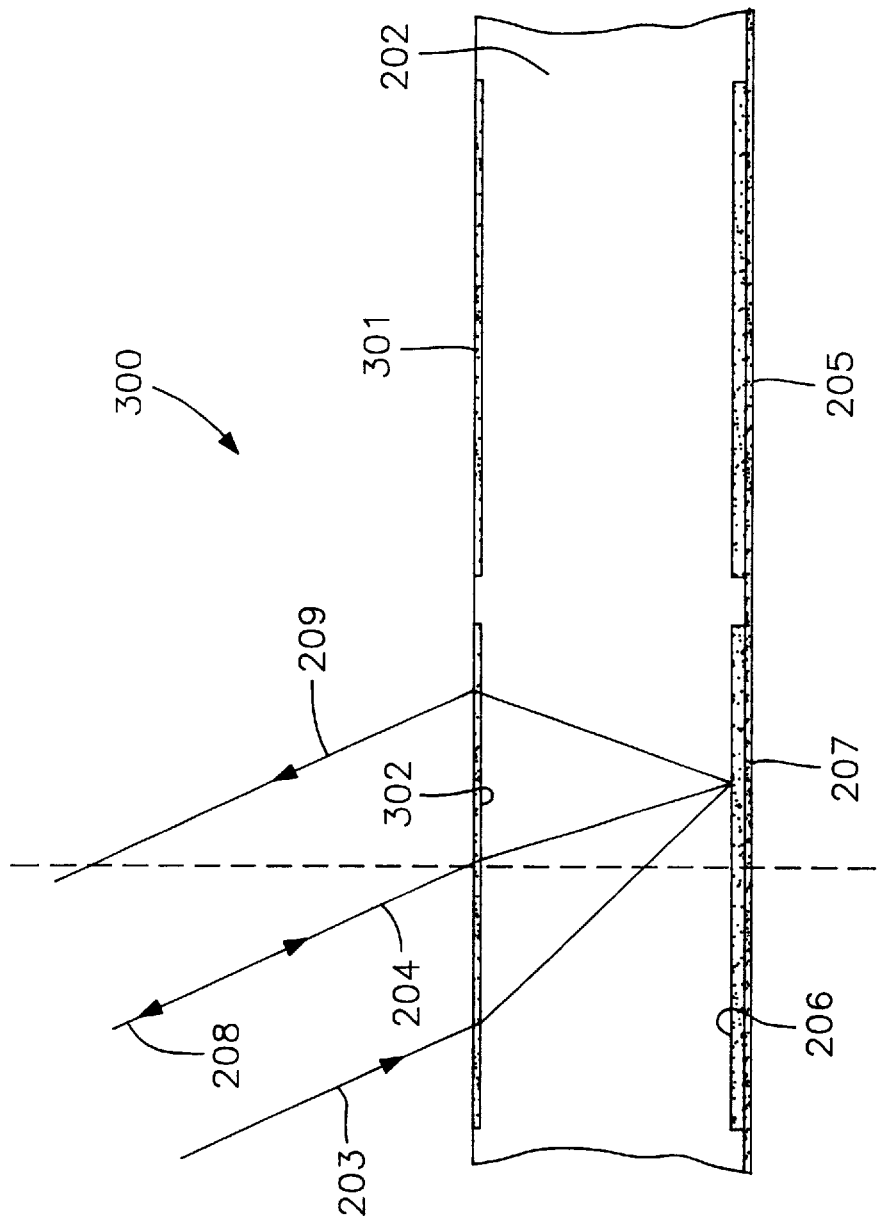
FIG. 3 shows a cross-sectional sketch of another preferred embodiment of a retroreflective sheeting material of the purely diffractive type according to the invention.

Referring to FIG. 3 there is shown a cross-sectional sketch of a section of a preferred embodiments of retroreflective sheeting material 300 according to the invention comprising an entrance transmission optical element 301, consisting of a transmission diffractive optical element comprising a surface relief diffractive pattern 302 at the front side of a sheeting substrate 202 and a reflective optical element consisting of a reflective diffractive optical element 205 including a diffractive surface relief pattern 206 and a reflective coating 207 at the back side of the sheeting substrate 202 opposite to the entrance transmission optical element 301.

As in FIG. 2 at least a part 208 of the incident electromagnetic radiation is sent back along the direction of the incoming chief ray 204.

Referring to FIG. 4A–D there is shown a cross-sectional sketch of a section of a preferred embodiment of a retroreflective sheeting material 400 according to the invention comprising an entrance transmission optical element 301 consisting of a surface relief diffractive pattern at the front side of a sheeting substrate 202 and a diffuse reflective optical element 405 at the back side of the sheeting substrate 202 opposite to the entrance transmission optical element 301.

Figure 4A:
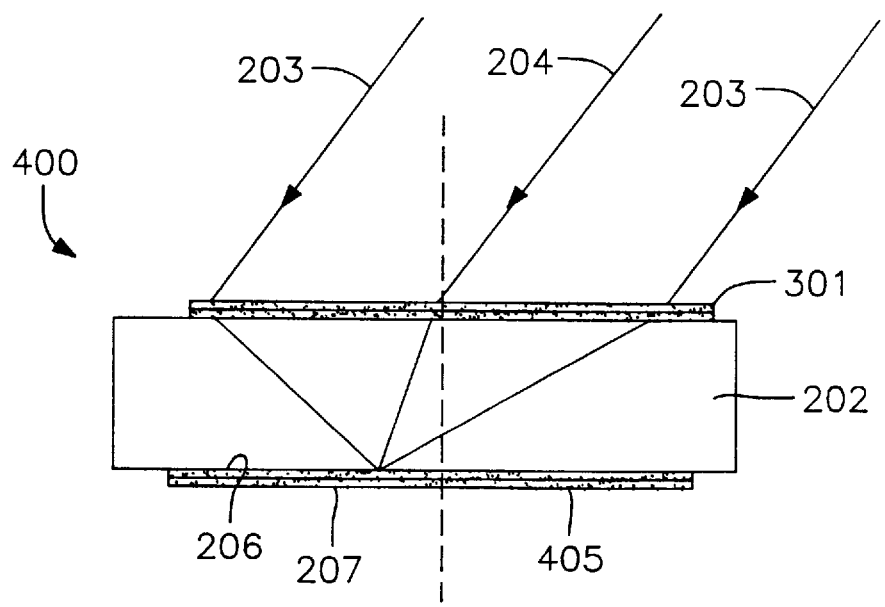
FIGS. 4A–4D show cross-sectional sketches of still another preferred embodiment of a retroreflective sheeting material of the diffractive type with a diffuse reflective optical element.
Figure 4B:
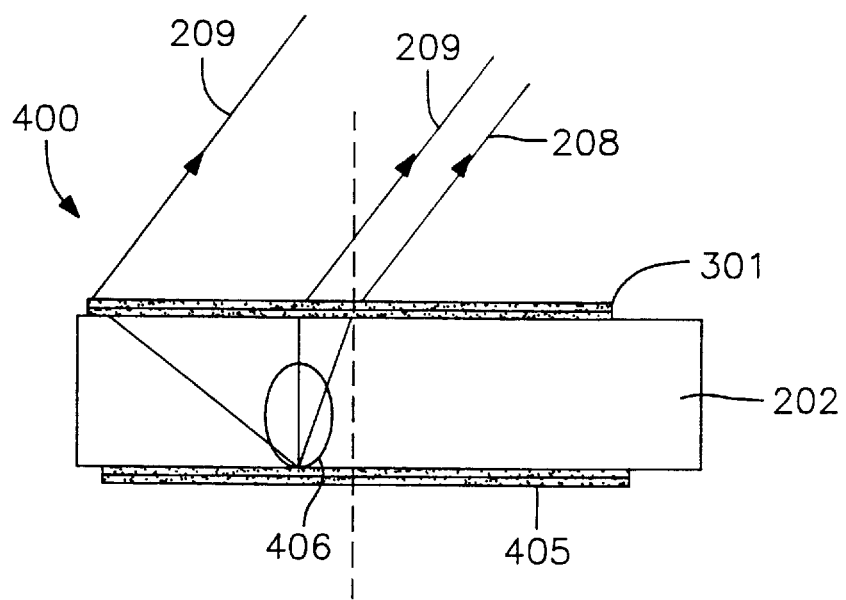
Figure 4C:
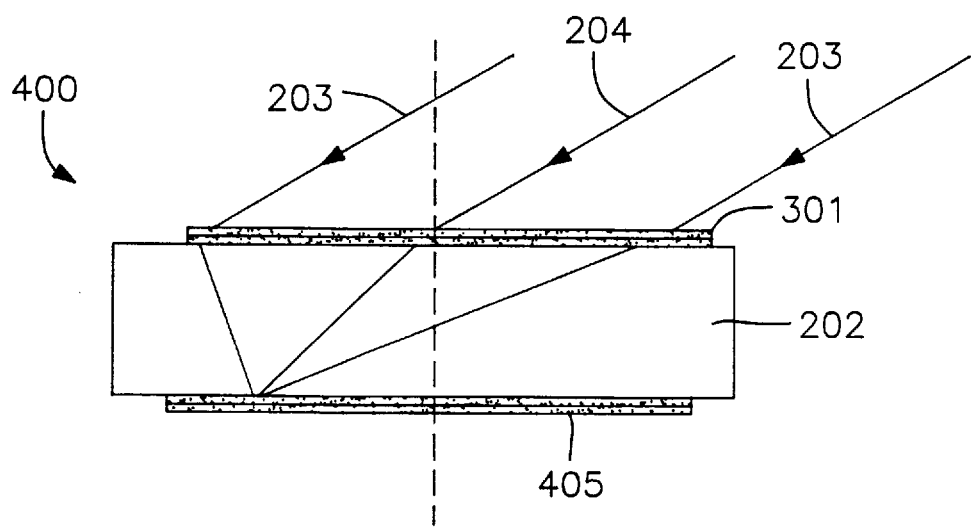

The principle of the retroreflective sheeting material is shown for two angles of incidence. In FIGS. 4A and 4B the principle is shown for a relative small angle of incidence, and in FIGS. 4C and 4D the principle is shown for a relative large angle of incidence. The focusing effect of the entrance diffractive optical element 301 is illustrated in FIGS. 4A and 4C and the diffuse back reflection from the diffuse reflective optical element 405 is illustrated in FIGS. 4B and 4D.

Figure 4D:
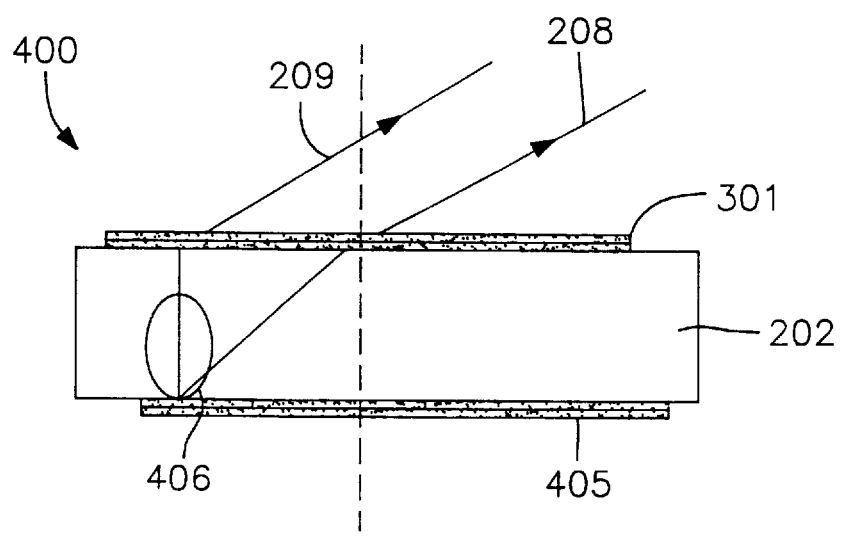

A near Lambertian irradiation distribution is indicated by the ellipsoid 406 in FIGS. 4B and 4D. This diffuse non-specular reflection ensures that at least a part 208 of the incident electromagnetic radiation is send back through the entrance optical element 307 along the direction of the incoming chief ray 204.

B. Methods of Making Retroreflective Sheeting Materials

A preferred total retroreflective optical system of the purely diffractive type according to the invention comprises a focusing transmission diffractive optical element, a spacing material/sheeting substrate and a reflective diffractive optical element.

In an embodiment the total retroreflective optical system can be produced by separately producing the focusing transmission diffractive optical element on a first sheeting substrate and the reflective diffractive optical element on a second sheeting substrate followed by joining the two sheeting substrates, optionally with a spacing material there between.

A diffractive optical element incorporated in a sheeting material according to the present invention can be produced by a lithographic production process which is useful for the production of a retroreflective optical system for any desired wavelength.

Also, it can be produced by an interferometric production process which is the simplest way of producing retroreflective optical systems for wavelengths in the 400–500 nm region.

When optimum retroreflection is desired for normal incidence, the process of production is greatly simplified by the fact that the two diffractive elements can be made from the same mathematical calculations (in the lithographic method as described below) or in the same geometrical setup (in the interferometric method as described below). The diffractive structures in the two diffractive elements will be identical except that the depth of the surface profiles or otherwise diffractive material will be different. The optimum depth of the diffractive structures can be achieved by a skilled person either empirically or by using a diffraction efficiency calculation as described in "Diffraction Analysis of Dielectric Surface-Relief Gratings" by M. G. Moharam & T. K. Gaylord in Journal of Optical Society of America, Vol. 72, No. 10, November 1982, p. 1385–1392.

The production processes of diffractive optical elements described below can therefore be used for producing both the focusing transmission diffractive optical element and the reflective diffractive optical element in the sheeting substrate, with the exception that the optimum depth of the diffraction material is different for the two elements.

Furthermore, a reflective layer is preferably applied to the reflective diffractive optical element thereby maximizing the diffraction efficiency of the reflection orders of diffraction. This reflective layer can be applied by sputtering on a metal layer by use of e.g. an equipment as the Diode Sputter Coater SC510 supplied by Bio Rad Micro-Science Division or a similar supplier.

The process of transferring the diffractive pattern from the photoresist surface to the sheeting substrate is described below in the section "Replication of Diffractive Optical Elements".

"Test Element"

For illustration of the production of a purely diffractive type retroreflective sheeting material, a test element was designed for best use with a wavelength of 550 nm. A fused silica substrate having a refractive index of 1.46 and a thickness of 200 $\mu$m was used. An array of 14×14 diffractive Fresnel zone patterns each of about 300 micrometer squared was used both as front and back side optical elements.

An image of the produced entrance focusing transmission diffractive optical element obtained by scanning electron microscopy of a diffractive optical element produced by lithographic means is shown in FIG. 5. Only a part near the centre of the diffractive optical element is shown. A scale unit 501 of 1 micrometer indicates the size of the surface relief structures. Both the surface relief structure 502 and the substrate material 503 are fused silica.

The test element is not intended for replication applications. Therefore, the diffractive optical elements were both incorporated on both sides of the fused silica substrate.

"Substrate Preparation"

Alignment marks aligned from front to back side of the silica substrate was needed in order to achieve the required positioning accuracy in the following e-beam writing. The front array of diffractive optical elements should preferably be aligned with an accuracy in the range of 5 $\mu$m to the back array of diffractive optical elements.

Firstly, a standard photomask with the desired alignment marks was made by making a 10 to 1 reduction copy of a simple overhead film with the desired alignment marks printed in a LaserJet IIIP from Hewlett Packard. This reduction was made in a reduction camera using a standard photographic reduction lens. The exposure was made on HDP plates from the company KODAK and developed and fixed in accordance with the prescriptions from KODAK.

The photomask consisted of 2 crosses placed with about 27 mm distance. The lines in the crosses were about 5 $\mu$m thick near the center of the crosses and about 1 mm in the line ends farthest away from the center. This gave an easier detection of the alignment marks, but is not essential for good results. The marks were transmitting for visible and UV wavelengths, while the rest of the photomask was absorbing.

The substrate was coated on the front side with a photoresist 5206 from the company Hoechst. This was done by cleaning, spin coating and baking in accordance with prescriptions from the photoresist supplier. This resist can be used both as positive and as a negative resist. In this case prescriptions for use as a positive resist were used.

The photomask with the two alignment marks was used as mask plate and the photoresist coated substrate as wafer in a mask aligner AL 6-2 from the company Electronic Visions Corporation, Scharding, Austria. Exposure was performed in accordance with the prescriptions from the manufacturer. For a resist thickness of 0.5 $\mu$m an exposure time of 15 seconds was found to give the best results. After exposure the substrate was developed in a Microposit 351 developer from the company Shipley, in accordance with the prescriptions from the resist supplier. This gave a transferred pattern of alignment marks, wherein the crosses now appear as holes in the resist, as the developer has removed resist material.

The substrate with the now exposed front side was placed in a thermal evaporation system from the company AVAC for depositing first a thin 50 Å layer of Cr and then a 200 Å layer of Au. The Cr was needed for binding the Au to the silica substrate, and the Au gave alignment marks which later could be seen in the scanning electron microscope mode of the e-beam writer. After evaporation the substrate was given an ultrasonic bath in acetone, which dissolved the photoresist, giving a lift off process, where only the exposed alignment mark crosses were Cr/Au coated. The rest of the Cr and Au was lifted off with the dissolved resist.

This finished the preparation of the first side. The second side was prepared in the same way, by exposing in the mask aligner with the second side towards the mask and light source, but with the mask aligned to the now visible Cr/Au marks on the first side of the substrate. This could be done in the AL 6-2 mask aligner as the equipment has the necessary front to back alignment system. This was essential for the making of this prototype, and it must be noticed that most present mask aligners do not have this facility.

Now, with the substrate with well-aligned alignment marks on front and back side, the substrate was prepared for the electron beam and etching process. This was done by spincoating front side of the substrate with a Novolak based photoresist such as the Microposit 1400 series from Shipley and afterwards baking the substrate for 45 minutes at 225° C., which gave a very hardbaked photoresist. This layer would later function as an etching mask for the etching of the diffractive structures in the silica. On top of the hardbaked photoresist of 500 Å layer of Ge was evaporated in a vacuum evaporator such as the AVAC evaporator. This layer would later serve as a conducting layer in the e-beam process as well as an etching mask for etching the diffractive structures in the photoresist. Again on top of this a 150 nm layer of e-beam resist such as the SAL 601 was spincoated. This 3 layer resist/Ge/resist has given the best results for achieving deep small feature size etching in fused silica, but other materials could be used. After exposure and etching on the front side as described below, the 3 layer resist/Ge/resist was coated and evaporated on the back side. Exposure and etching of the back side was then made as the first exposure on the front side.

"Data Preparation"

A Fresnel zone pattern for the e-beam fabrication was prepared using the JEOL language. The pattern was made of commands resulting in concentric circular rings. The Fresnel zone pattern was chosen to give a Fresnel zone diffractive lens having an effective focal length in silica—the used sheeting material—equal to the thickness of the silica substrates. This was calculated according to standard Fresnel zone plate equations as given in "OPTICS", 2nd edition by Eugene Hecht, Adelphi University, ISBN 0-201-11611-1, p. 445+.

This Fresnel zone pattern is a diffractive pattern that ensures that for substantially all angles of incidence at least a part of the incident light is sent back along the direction of the incoming chief ray.

"E-beam Fabrication"

After reading the pattern data into the file server attached to the e-beam equipment, calibration of the e-beam equipment was done in accordance with the prescriptions from the manufacturer. The data was loaded into the exposure computer system, and after loading the prepared substrate the alignment marks were found on the front (first) side of the substrate by using the scanning electron microscope mode of the equipment. By reading the absolute positions of the alignment marks on the equipment laser stage control and by feeding these to the computer in accordance with the manuals of the system, a correct positioning of the pattern on the front side could be made automatically by the exposure computer system. The exposure was started and in this case with a 5×5 mm array or diffractive lenses an exposure time of about 5.5 h was needed. After exposure the substrate was postexposure baked for 20 minutes at 110° C. and developed for 2 min in a standard developer from Shipley (named "Developer") for Novolak based e-beam resist. This removed the non-exposed resist, which leaved the exposed diffractive structures as rings of e-beam resist on top of the photoresist/Ge layers on the silica. After transferring these structures to the silica by etching as described below the substrates second (back) side was prepared with the 3 layer (resist/Ge/resist) system, and exposure in e-beam, baking and development was made on this second side in the same way as described above. The second side diffraction structures were then transferred to the underlying silica in the same way as the first side, as described below.

"Pattern Transfer"

The exposed diffractive structures in the e-beam resist were transferred to the underlying layers of Ge, photoresist and finally to the silica substrate by reactive ion etching. All reactive ion etching was done in a Vacu Tec Plasma System installed with $CHF_3$, $SF_6$ and $O_2$ gasses. The pressure and effect parameters of the system are critical for getting a good anisotropic etch and it should be noted that the best parameters can be quite different from equipment to equipment. A skilled person should make a series of tests to find the best parameters for each specific system. It should be noted that a low pressure and a high effect gives a very anisotropic etching with vertical sidewalls in the etched structures, while a high pressure and a low effect gives a very selective etching.

Firstly, the diffractive structures were transferred from the e-beam resist to the 500 Å Ge by 20 sec. reactive ion etching with 6 m Torr $SF_6$, 20 $cm^3$/min and an effect of 87 W. Secondly, the 500 nm hardbaked photoresist between the Ge and the silica was etched by 250 sec. of reactive ion etching with 6 m Torr, 30 $cm^3$/min $O_2$ and an effect of 240 W. Finally, the structures were transferred to the silica by reactive ion etching with 30 m Torr, 30 $cm^3$/min $CHF_3$. For the first side, where a structure depth of about 1 $\mu$m was desired the etching time for the silica was 39 minutes, and for the back side, where the desired depth was about 0.5 $\mu$m, the etching time of 19.5 minutes was used. This silica etch also removed any remaining Ge.

As an extra step an oxygen etch similar to the one used for the photoresist etching described above was given for 3 minutes to clean the element for remaining resist, and cleaning the vacuum chamber. This is not a vital step for the use of the retroreflector, but was used to give a pure hard silica surface.

"Back side reflection"

As the last step in the fabrication the back side was coated with 500 nm aluminium, to give a high reflectance. This was done in an evaporator similar to the one used for the Au and Cr evaporation.

"Interferometric Recording of a Diffractive Optical Element"

Another method of producing a diffractive optical element according to the invention is by using an interferometric recording setup as described in general holographic literature such as "Optical Holography" by P. Hariharan, Cambridge University Press, Cambridge 1984 ISBN 0 521 24348 3. For clarity this method is described more thoroughly in the following.

Figure 6:
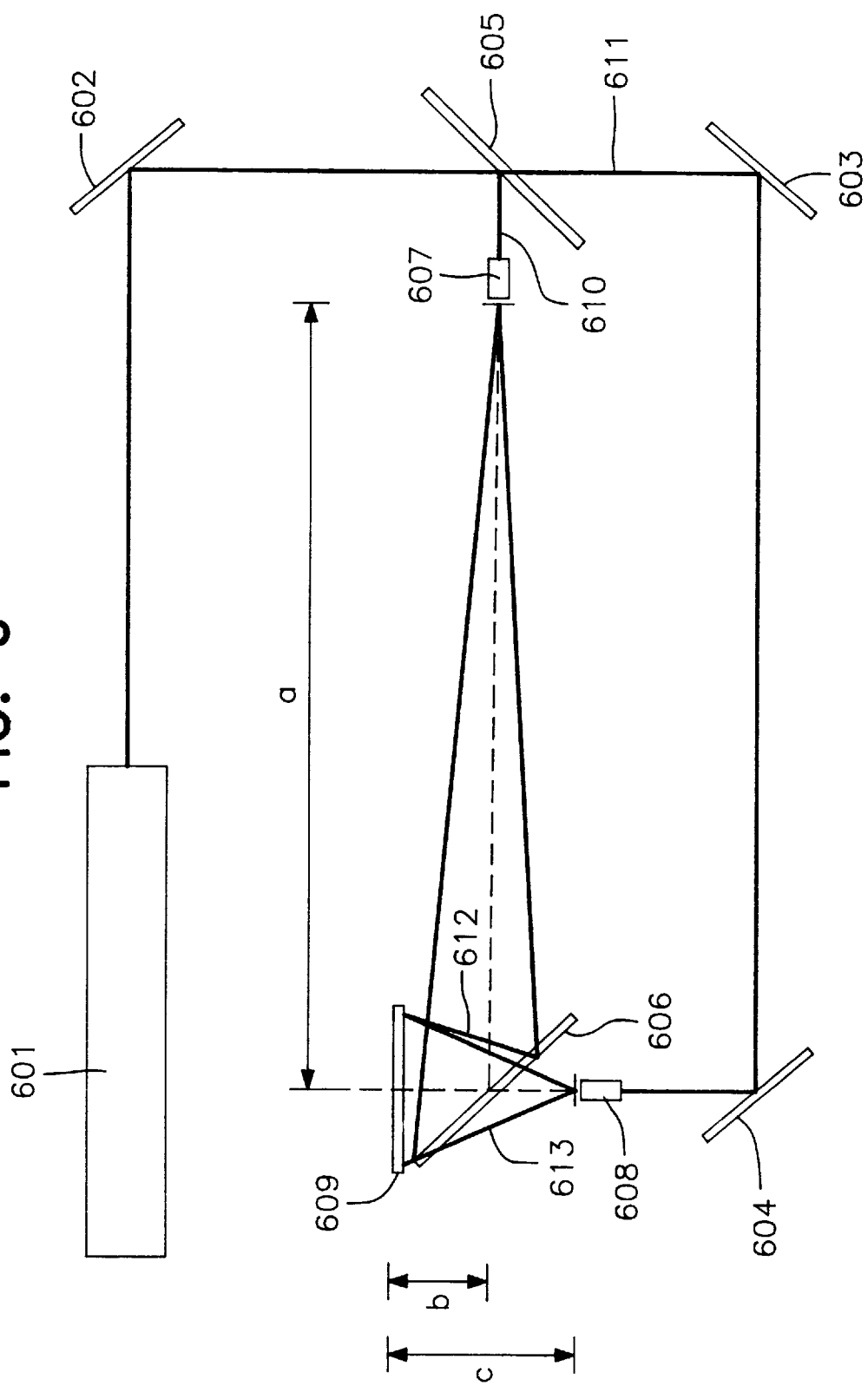
FIG. 6 shows a sketch of a setup for interferometric recording of a diffractive optical element incorporated or to be incorporated in a retroreflective optical system of a sheeting material according to the invention.

A holographic setup for recording a focusing diffractive optical element is shown in FIG. 6. A coherent laser 601 having a wavelength suitable for the recording material is used as light source. Furthermore, the setup makes use of standard optical mirrors 602, 603, 604, beam splitters 605, 606 and spatial filters 607, 608.

The holographic recording material 609 is preferably a photoresist such as the Microposit 1400 from the company Shipley. For this photoresist a suitable laser would be the Argon Ion Laser Model 2030, wavelength 488 or 457.8 nm, from the company Spectra Physics. This photoresist can be coated on a plane glass substrate by spin coating in accordance with the prescriptions from the photoresist manufacturer.

As shown in FIG. 6, the laser light is split by the beam splitter 605 in two separate beams 610, 611. The mirrors 603 and 604 direct the beam 611 through the spatial filter 608, and the beam splitter 605 directs the beam 610 through the spatial filter 607. Both spatial filters 607, 608 consist of a microscope objective and pin-hole for filtering the laser light and forming two gaussian beams 612, 613 originating from the pinholes which act as point sources. These two gaussian beams 612, 613 are both incident on the recording material 609 and the coherent nature of the laser light causes an interference pattern in the plane of the recording material. This interference pattern is recorded latent in the recording material. The recorded diffractive microstructure is then obtained by development of the recording material in accordance with the prescriptions from the supplier of the recording material.

The diffractive microstructures obtained by this process are dependent on the geometrical setup of the recording scheme. If the distance "a"+"b" from the spatial filter 607 to the recording material 609 is large compared to the distance "c" from the spatial filter 608 to the recording material 609, then the light from the spatial filter 607 can be considered a plane wave, and the focal length of the obtained focusing diffractive optical element will be equal to the distance "c". The diffractive optical element obtained in this process will therefore act as a sperical lens with focal length "c" when used in a setup similar to the recording setup with respect to plane wave illumination, refractive index, and wavelength. This ensures that the diffractive pattern of the reflective diffractive optical element for substantially all angles sends at least a part of the incident light back along the direction of the incoming chief ray.

Diffractive elements with these characteristics are used both as entrance transmission diffractive optical elements and as reflective diffractive optical elements.

The process of tranferring the diffractive pattern from the photoresist surfaces to the sheeting substrate is described below in the section "Replication of Diffractive Optical Element".

"Interferometric Recording of Diffuse Reflecting Diffractive Optical Element"

Figure 7:
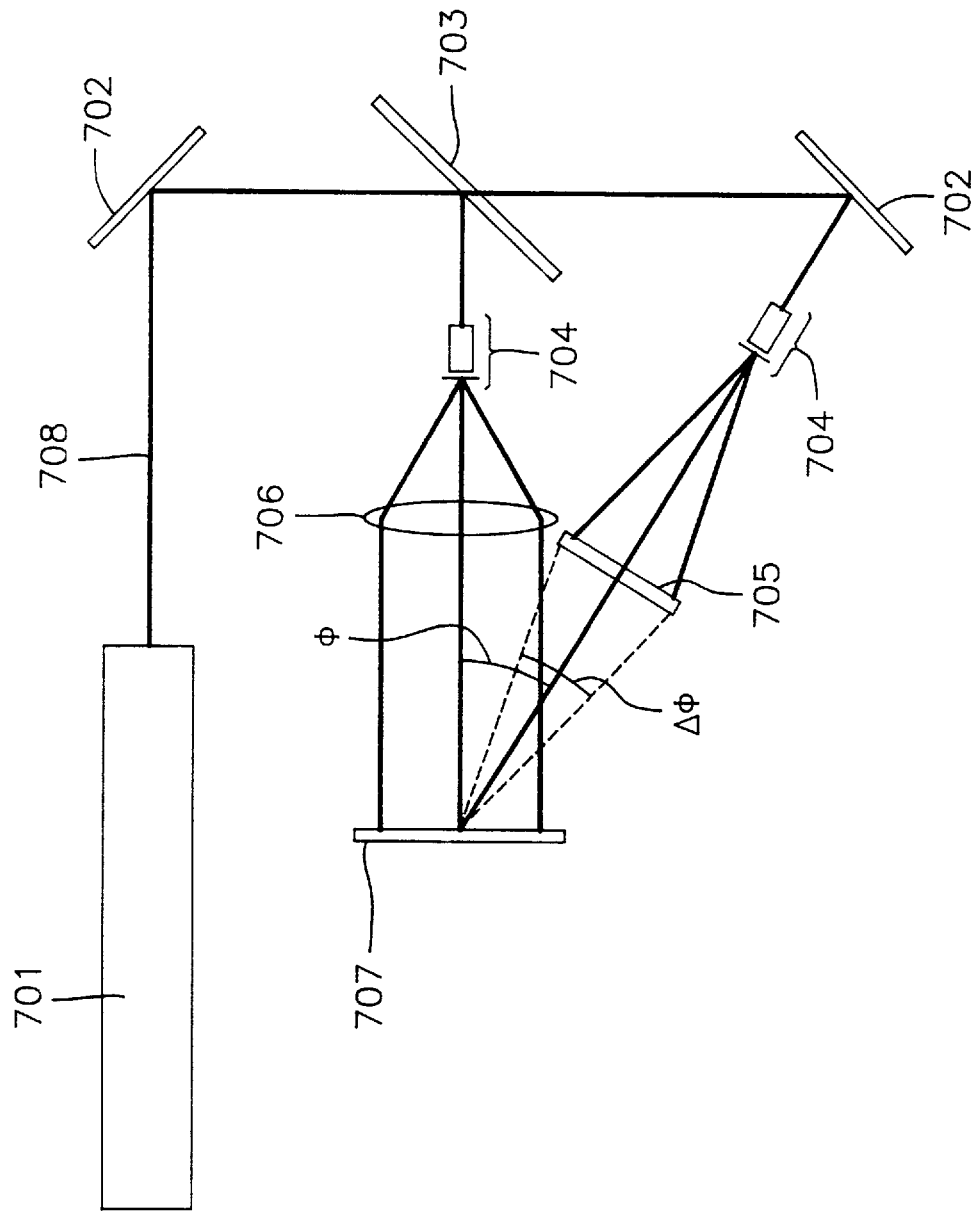
FIG. 7 shows a sketch of a setup for interferometric recording of a diffuse diffractive optical element incorporated or to be incorporated in a retroreflective optical system of a sheeting material according to the invention.

A holographic setup for recording a diffuse reflective diffractive optical element is shown in FIG. 7. A coherent laser with a wavelength suitable for the recording material is used as light source. Furthermore, the setup makes use of standard optical mirrors, beam splitters, spatial filters as well as a glass diffuser such as the "13FSD003" from Melles Griot, 1770 Kettering Str, Irvine, Calif. 92714.

The holographic recording material is preferably a photoresist such as the Microposit 1400 from Shipley. For this material a suitable laser would be the Spectra Physics Model 2030 Argon Ion Laser, wavelength 488 or 457.8 nm. This material can be coated on a plane glass substrate by spin coating in accordance with the prescriptions from the resist manufacturer.

FIG. 7 shows a geometric setup in which an interferometric recording of a diffuse diffractive optical element can be done. Referring to the figure, 701 designates a laser, 702—mirrors, 703—a beam splitter, 704—spatial filters, 705—a transparent diffuser, 706—a collimating lens, and 707—the holographic recording material coated on a substrate and 708 the laser beam.

As shown in the FIG. 7, the laser light 708 is split by the beam splitter 703 in two separate beams. The mirrors 702 direct these two beams through the spatial filters 704, which consist of a microscope objective and a pinhole, thereby filtering the laser light and forming two gaussian beams, originating from the pinholes which act as point sources. One of these gaussian beams is directly incident on the recording material, acting as a reference beam. The other gaussian beam is incident on the glass diffuser 705, giving a diffuse illumination of the recording material from a given direction, $\Phi$, and comprising a solid angle $\Delta\Phi$, acting as an object beam. The coherent nature of the laser light causes a complex interference pattern in the plane of the recording material 707. The desired complex diffusing microstructures can be obtained by developing the exposed recording material in accordance with the prescriptions from the supplier of the recording material.

The recorded microstructure pattern is actually an image hologram of the diffuser glass plate. The obtained hologram can therefore be reconstructed using the conjugated reference beam as a reconstruction illumination.

The diffractive diffuser hereby obtained is characterized in that it only directs diffused light in a specific direction comprising a specific solid angle of $\Delta\Phi$. The diffuser can therefore have a more energy efficient use, as no diffracted diffuse light is scattered in directions which are not wanted. Some spectral aberrations can however be seen. The geometric setup used for this fabrication should be designed to give the best diffuser for use in the desired geometries of the retroreflecttive sheeting material. This can be done by a skilled person in holography or according to the prescriptions and formulas in "Optical Holography" by P. Hariharan, Cambridge University Press, 1984, ISBN 0 521 31163 2.

The geometric setup should be chosen to ensure that the recorded diffractive diffuser sends a part of the incident light back along the direction of the incoming chief ray. This can be ensured by controlling $\Phi$ and $\Delta\Phi$ in the setup, compensated for different refractive index and wavelength from the recording setup to the use of the optical element.

The obtained diffractive diffuser can in a preferred embodiment be replicated by embossing to a polymer or plastic sheeting substrate as described in the section "Replication of Diffractive Elements".

"Production of a Retroreflective Sheeting Material"

In a preferred embodiment the retroreflective characteristics are achieved by two diffractive optical elements having a spacing equal to the effective focal length of the entrance transmission diffractive element. The geometry of the recording setup for the diffractive optical elements were therefore chosen to give diffractive optical elements with the correct focal length, that is a focal length equal to the desired distance between the two diffractive optical elements in the final sheeting material. In accordance with the above explanation of FIG. 6 this was accomplished by having a geometric setup with a large distance from one of the spatial filters to the recording material and having the desired focal length as the distance between the other spatial filter and the recording material.

To avoid unnecessary aberrations, the material between the spatial filters and the holographic recording material had the same refractive index as the spacer material used in the final sheeting material. Alternatively, the distances in the recording setup were changed to minimize the aberrations.

The wavelength used in the recording setup will also be the optimum wavelength for which the final retroreflective material can be used. Only for this wavelength aberrations will be minimized, and severe chromatic aberrations can be expected if the retroreflective material is used at wavelengths far from the recording wavelength. For use in the visible area a wavelength as close to the centre of the visible spectrum would be preferred, but the sensitivity of the available recording materials puts limitations to the freedom of choice. For known photoresists the sensitivity drops sharply for wavelengths above 500 nm therefore optimum wavelengths below 500 nm are the only choice available today if photoresists are used. Other recording materials such as dichromated gelatine, or holographic silverhalide plates such as the AGFA 8E75 gives a more wide range of available wavelengths, but there are no known suitable methods of mechanical replication of these materials.

The aperture of the individual diffractive optical element should be large enough to avoid annoying diffractive effects from the aperture. For a distance between the two diffractive elements of 100 μm and a spacing material with a refractive index of 1.5, good results are achieved with an aperture of the individual diffractive element of about 150 μm.

"Replication of Diffractive Optical Elements"

It is clear that for a large scale production, a holographic or lithographic recording of the individual element is not feasible. It will be necessary to record a master e.g. by the interferometric method described above and use this master in a replication. As both the reflective diffractive optical element and the entrance transmission diffractive element in the preferred embodiment are of the same kind and almost identical, the considerations of replication are the same for both these elements. As photoresist was used as the recording material, the diffractive patterns were achieved by microstructures in the surface of the resist. Replication was then achieved by making a hard metal copy of these microstructures by electroforming and using this metal copy as a master in an embossing process.

For achieving the right spacing between the front and back diffractive element simultaneous embossing of both sides of the sheeting material of the correct thickness was made.

An alternative replication technique is to emboss two separate sheeting materials and afterwards join these two materials together, thereby achieving the correct positions and distances of the two diffractive elements.

A description of an embossing replication technique similar to this one can be found in "Aztec Surface-Relief Volume Diffractive Structure" by James J. Cowan, Polaroid Corporation, Journal of the Optical Society of America, Vol. 7, No. 8, Aug., 1990, p. 1529, but careful experiments by a skilled person should be made to find the optimum parameters for pressure and temperature in the embossing process.

"Roll-to-Roll Embossing of Surface Relief Patterns in Opposite Surfaces of a Sheeting Substrate"

Figure 8:
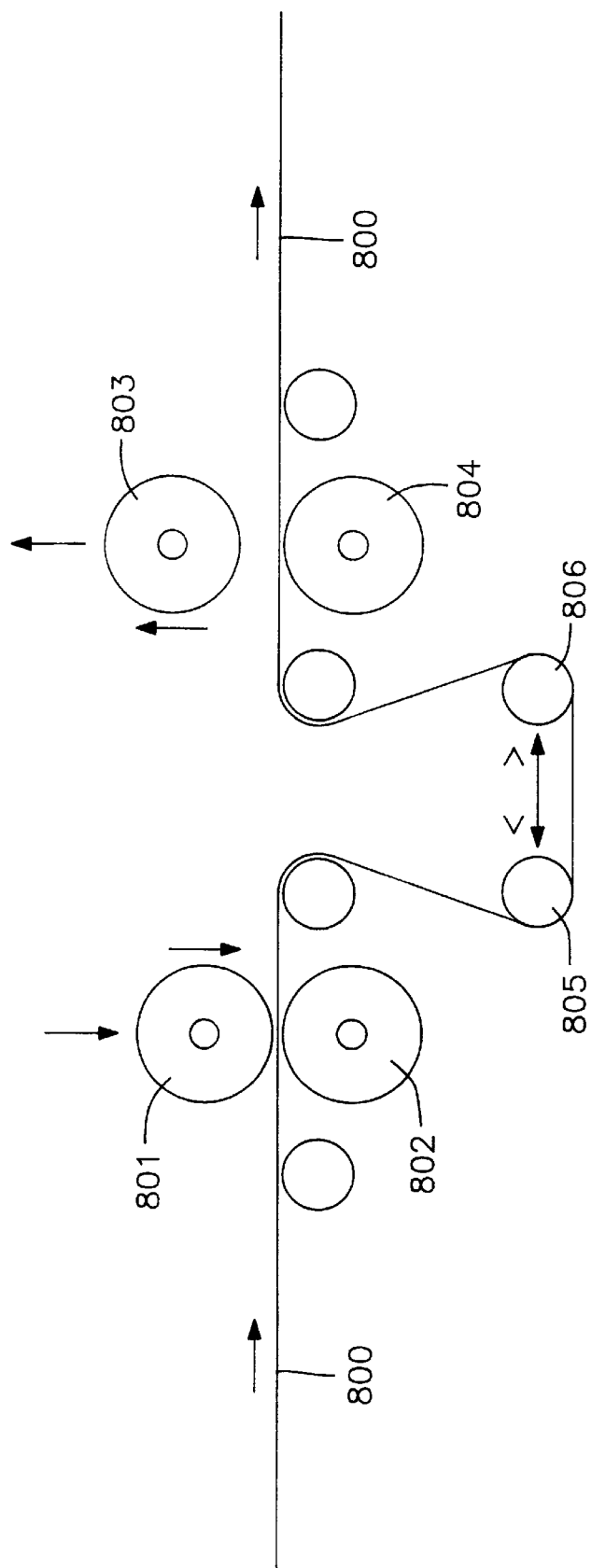
FIG. 8 shows a sketch of a roll-to-roll embossing of a continuously moved sheeting substrate material.

Referring to FIG. 8, there is shown an illustration of a roll-to-roll embossing af a continuously moved sheeting substrate 800.

The sheeting substrate in the form of a transparent plastic foil is introduced between two embossing rolls 801, 802 having thereon two hard master holograms of the respective surface relief patterns and embossing simultaneously the pair of the surface relief patterns on each side of the foil.

In a preferred embodiment, only 50% of the total embossing takes place by rotating the embossing rolls 801, 802 a half rotation and then lifting the roll free from the sheeting substrate, whereas the other 50% of the embossing takes place by the embossing rolls 803, 804 further down the line in a similar manner. It is possible to make adjustments of the embossing matrices by means of rolls 805 and 806 so that the surface relief patterns are aligned vis-a-vis each other.

"Positioning Control"

Figure 9:
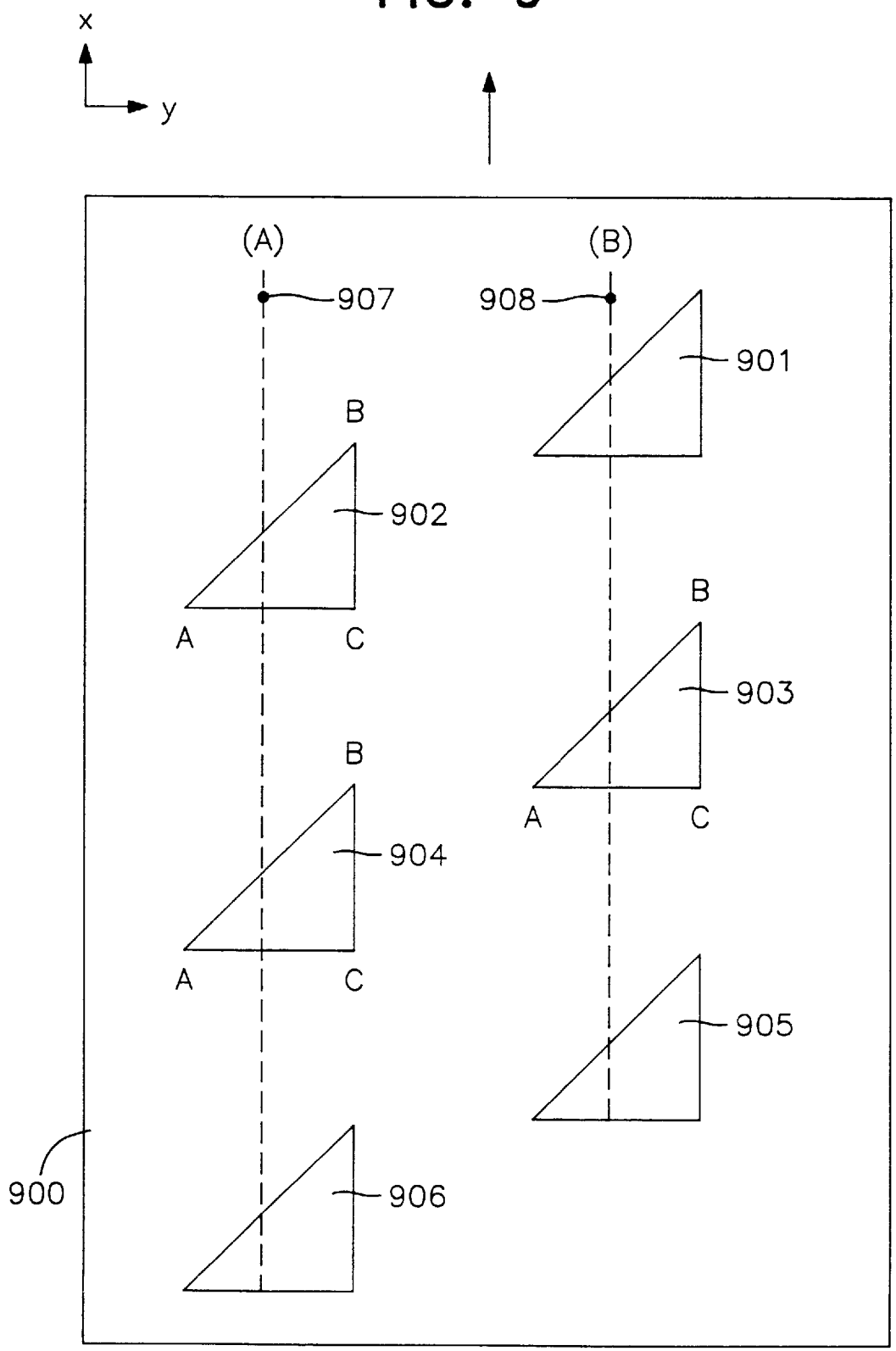
FIG. 9 shows a section of a sheeting substrate material with embossed position markers in form of triangles.

Referring to FIG. 9, there is illustrated a number of position markers in form of triangles 901–906 embossed in two rows in a transparent polymer foil 900, the triangles are orientated so that the perpendicular sides coincide with the X-axis and the Y-axis, respectively, of the polymer foil; said foil being moved longitudinally in the direction of the X-axis.

Only a section of the polymer foil is shown. The sandwich surface relief diffractive optical elements are not shown.

Laser diode and detector combinations 907, 908 are provided in each row (A) and (B).

When light from the laser diode and detector combinations 907 hits the hypothenuse AB of e.g. triangle 902, a Y-timer is stopped and it is started, when the light hits the cathetus AC.

Following the movement of the polymer foil 900, the hypothenuse of the triangle 904 of the next position marker stops the Y-timer. If the measured timer difference is longer than the predetermined timer difference for a correctly moving foil, the foil has moved into the positive Y-direction. If it is shorter, the foil has moved into the negative Y-direction.

The timer difference is sent to a process computer which may provide signals for the Y-directional adjustment of the position of the embossing matrices, the polymer foil, or both, until subsequent Y-timer time differences are within acceptable limits.

For the adjustments of the X-direction an X-timer is started when the light from the laser diode and detector combination 907 hits the cathetus AC of the tringle 902, and it is stopped when the light from the laser diode and detector combination 908 hits the cathetus AC of the triangle 903. If the measured time difference is longer than the predetermined time difference for a correctly moving foil, the foil on one of the foil webs has moved too slowly in the X-direction, and if the time difference is shorter, it has moved too fast in the X-direction. The time difference is sent to the process computer which may provide signals for the adjustment in the X-direction in a similar manner to that described above for the adjustment in the Y-direction.

We claim:

1. A retroreflective sheeting material comprising at least one retroreflective optical system consisting of:
    a) an entrance transmission optical element for receiving and focusing incident electromagnetic radiation from an irradiation source, and
    b) a reflective optical element for reflecting the incident electromagnetic radiation back towards the irradiation source;
    said reflective optical element being positioned in or near the effective focal point of the transmission optical element; the space between the optical elements optionally being constituted by a spacing material; and
    c) at least one of the optical elements being a diffractive optical element;
wherein for both small and large angles of incidence to the entrance transmission optical element the reflective optical element sends the incident electromagnetic radiation back through the entrance transmission optical element by non-specular reflection.

2. A material according to claim 1, wherein the reflective optical element consists of a diffractive optical element having a reflective optical coating coated on its back boundary.

3. A material according to claim 2, wherein the diffractive optical element consists of a transmission diffractive optical element.

4. A material according to claim 1, wherein the reflective optical element is a diffuse reflective optical element.

5. A material according to claim 1, wherein the orientation of the center axis of the entrance transmission optical element with respect to the orientation of the center axis of the reflective optical element is selected from the group of axis orientations consisting of non-parallel axes, substantially parallel axes, or substantially coinciding axes.

6. A material according to claim 1, wherein the entrance transmission optical element is a focusing transmission diffractive optical element.

7. A material according to claim 1, at least one of the optical elements comprise surface relief diffraction patterns.

8. A material according to claim 1, wherein the space between the optical elements is constituted by a spacing material selected from the group consisting of dielectric or substantially dielectric materials such as glass, hard plastic, soft plastic, air, or combinations of these.

9. A material according to claim 1, wherein at least one of the entrance transmission optical element, the reflective optical element, or the spacing materials contain one or more dyes.

10. A material according to claim 1, wherein a protective material is coated on the front boundary of the entrance transmission optical element, the back boundary of the reflective optical element, or both.

11. A material according to claim 1, wherein the at least one retroreflective optical system is fixed to a carrier.

12. A method of making a retroreflective sheeting material comprising at least one retroreflective optical system as defined in claim 1 wherein the entrance transmission optical element consists of a diffractive optical element; the method comprising the steps of:
   a) providing an entrance focusing transmission diffractive optical element on a first sheeting substrate;
   b) providing a reflection optical element on a second sheeting substrate;
   c) joining the first sheeting substrate together with the second sheeting substrate so that the reflection optical element is positioned in or near the effective focal point of the entrance focusing transmission diffractive optical element; and
   d) optionally coating a protective material on the front boundary of the entrance transmission optical element, the back boundary of the reflective optical element, or both.

13. A method according to claim 12, wherein the reflective optical element is a reflective diffractive optical element.

14. A method according to claim 12, wherein the reflective optical element is a diffuse reflective optical element.

15. A method of making a retroreflective sheeting material comprising at least one retroreflective optical system as defined in claim 1 wherein the entrance transmission optical element consists of a diffractive optical element; the method comprising the steps of:
   a) providing an entrance focusing transmission diffractive optical element on a first side of a sheeting substrate;
   b) providing a reflection optical element on the opposite side of the sheeting substrate;
   said reflection optical element being positioned in or near the effective focal point of the entrance focusing transmission diffractive optical element; and
   c) optionally coating a protective material on the front boundary of the entrance transmission optical element, the back boundary of the reflective optical element, or both.

16. A method according to claim 15, wherein the reflective optical element is a diffractive optical element.

17. A method according to claim 15, wherein the reflective optical element is a diffuse reflective optical element.

18. A method according to claim 15, wherein the entrance focusing transmission optical element and the reflection diffractive optical element are provided simultaneously on the first and opposite sides of the sheeting material.

19. A method according to claim 15, wherein the sheeting material has a thickness substantially equal to the effective focal length of the entrance focusing transmission diffractive optical element.

20. A method of producing a sheeting material comprising at least one retroreflective optical system as defined in claim 1 wherein the entrance transmission optical element and the reflective optical element consist of surface relief optical elements on opposite sides of the sheeting material, the method comprising the steps of:
   a) providing a first embossing matrice comprising a surface relief diffraction pattern of the entrance transmission optical element;
   b) providing a second embossing matrice comprising a surface relief pattern of the reflective optical element; and
   c) embossing the pair of surface relief patterns either simultaneously or subsequently in opposite surfaces of the sheeting material.

21. A method according to claim 20, wherein the surface relief pattern of the second embossing matrice is a diffractive pattern.

22. A method according to claim 20, wherein the surface relief pattern of the second embossing matrice is a diffuse reflective pattern.

23. A method of according to claim 20, wherein the embossing step consists of thermo-mechanical embossing the pair of surface relief patterns simultaneously in opposite surfaces of the sheeting substrate.

24. A method according to claim 20, wherein the embossing step consists of a continuous roll-to-roll process.

25. A method according to claim 24, wherein both the entrance transmission optical element and the reflective optical element are surface relief diffractive optical elements, and wherein the embossing step further comprises controlling the position of the embossing matrices, the sheeting substrate, or both.

26. A method according to claim 25, wherein said position control comprises:
   a) embossing position markers in the sheeting substrate;
   b) measuring relative displacements in predetermined directions of the position markers; and
   c) adjusting the positions of the embossing matrices, the sheeting substrate, or both, when the measured relative displacements of the position markers exceed predetermined limits.

27. A method according to claim 26, wherein the position markers are in form of triangles.

28. A method according to claim 20, wherein the embossing matrices form the parts of a moulding form, wherein the sheeting substrate in form of a fluid thermoplastic or an UV- or thermosetting plastic, or any suitable precursor therefor, is moulded.

29. Use of a retroreflective sheeting material according to claim 1, or a reflective sheeting material made by a method according to claim 12 for the manufacture of a sign such as a road sign, a marker such as a sticker, or a decoration; said sign, marker, or decoration exhibiting retroreflective reflexes upon illumination.

30. A material according to claim 1, wherein the reflective optical element consists of a diffractive optical element and a reflective coating having a spacing material therebetween, said spacing material being selected from the group consisting of dielectric or substantially dielectric materials.

* * * * *